United States Patent
Hosaka et al.

(10) Patent No.: US 6,196,484 B1
(45) Date of Patent: Mar. 6, 2001

(54) PHOTOGRAPHIC 120-SIZE FILM ROLL

(75) Inventors: Shunichi Hosaka; Masayoshi Nagata; Yukiyoshi Ishii, all of Minami-ashigara (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/422,345

(22) Filed: Oct. 21, 1999

(30) Foreign Application Priority Data

Oct. 21, 1999 (JP) .................................................. 10-318366

(51) Int. Cl.$^7$ ............................. B65H 18/28; G03B 17/26
(52) U.S. Cl. .................................... 242/160.4; 242/348.4; 396/512
(58) Field of Search ................................ 242/160.4, 348, 242/348.1, 348.4; 396/512, 513

(56) References Cited

U.S. PATENT DOCUMENTS

| | | | |
|---|---|---|---|
| 5,049,928 | * 9/1991 | Tirone | 242/348 X |
| 5,528,326 | * 6/1996 | Lawther | 242/348 X |
| 5,845,869 | * 12/1998 | Makino | 242/348.1 X |
| 5,855,336 | * 1/1999 | Inoue et al. | 242/348.4 X |
| 5,934,592 | * 8/1999 | Makino | 242/348.4 |
| 6,022,678 | * 2/2000 | Makino | 242/348.4 X |
| 6,048,676 | * 4/2000 | De Leener et al. | 242/348.4 X |

* cited by examiner

Primary Examiner—Donald P. Walsh
Assistant Examiner—William A. Rivera
(74) Attorney, Agent, or Firm—Sughrue, Mion, Zinn, Macpeak & Seas, PLLC

(57) ABSTRACT

An improvement of a photographic film roll composed of a spool which has a spool core having a slit therein and a flange at both ends of the spool core and a photographic 120-size film which is placed and fixed on a continuous light-shielding backing paper in which one end of the backing paper is inserted into the slit of the spool and other portion of the backing paper is wound on the spool to form multiple convolutions, resides in that the backing paper has at the center in its longitudinal direction a width less than the distance between the two flanges measured at the position of ½ of height of the flanges and has two wide areas of at least 10 cm long one of which is within 50 cm area measured from its one end and another of which is within 50 cm area measured from its another end, the width of each wide area being larger than the distance between the two flanges measured at the tops of the flanges.

7 Claims, 3 Drawing Sheets

Length of Backing Paper
(from slit-inserted end)

PHOTOGRAPHIC 120-SIZE FILM ROLL

FIELD OF THE INVENTION

This invention relates to a photographic 120-size film roll which is easily produced and highly protected from exposure to light.

BACKGROUND OF THE INVENTION

The well known 35 mm roll film is encased in a magazine and sold on market in that form. The encased 35 mm roll film is as such charged into a camera and exposed to light for every shooting. The encased 35 mm roll film is then taken out of the camera and processed in a darkroom to produce photographic images. Thus, the 35 mm roll film is highly protected from unintentional exposure to light in a magazine.

In contrast, a Brownie film of 120 size of 220 size is not encased in a magazine and is protected from exposure to light by a combination of a pair of light-shielding flanges equipped at both ends of a spool and a light-shielding backing or leader paper, respectively.

A typical structure of the photographic 120-size Brownie film roll is illustrated in FIG. 1 in an extended form. A typical photographic 120-size film roll comprises a spool 13 which has a spool core 14 having a slit therein and a flange 15 at both ends of the spool core 14 and a photographic film 12 which is placed and fixed by an adhesive tape 21 on a continuous light-shielding backing paper 11 in which one end of the backing paper 11 is inserted into the slit of the spool core 14 and other portion of the backing paper 11 is would on the spool core 14 to form multiple convolutions. The outermost convolution of the backing paper 11 is fixed on its preceding convolution by a sealing tape 111a so that the photographic film 12 can be protected from exposure to light.

Although the photographic 120-size film is protected from exposure to light by a combination of a pair of the flanges and the light-shielding backing paper, it is liable to be exposed to light in its side area. The light sometimes enters through an unintentionally produced space or clearance between a side edge of the backing paper and a periphery of the flange to expose the side area of the photographic film.

In order to avoid the unintentional exposure of photographic film, the known backing paper is produced to have a width equal to or slightly larger than the distance between the two flanges of the spool. However, the use of a light-shielding backing paper having a width equal to or slightly larger than the distance between the two flanges sometimes disturbs smooth winding due to possible friction produced between the side edge of the backing paper and the inner surface of the flange. In that case, the photographic film roll wound on the spool core likely has a diameter or a height larger than the diameter or height of the flange. Thus formed photographic film roll is easily exposed to light when it is not placed within a light-shielding bag or a camera.

Japanese patent Provisional Publication No. H4-136842 describes a photographic film roll using a light-shielding backing paper which has a width ($L_1$) satisfying the condition of $(L_1-L_2)/L_1=-1\%$ $-0.3\%$ at 23° C., 50% RH [$L_2$ is a distance between the two flanges] and which has one or two skived thinner side portions. The backing paper is adjusted to have a water content of 3 wt. % or less, wound on a spool, and made to have a water content of 4 to 9 wt. %. According to the description of the Publication, the backing paper has an increased width upon having the increased water content so that the side edges of the backing paper are brought into close contact with the inner surfaces of the flanges. Moreover, the skived side portion of the backing paper becomes more flexible to enable more close contact with the inner surface of the flange. For these reasons, a continuous photographic film is tightly wound on a spool and thus produced photographic film roll is highly protected from exposure to light. It seems that the disclosed photographic film roll is economically disadvantageous because an additional step for skiving the side portion(s) of the backing paper should be included in the preparation of the photographic film roll.

Japanese Patent Provisional Publication No. H9-288335 describes a photographic film roll in which a depression in the form of a ring is formed in a flange surface and a backing paper is adjusted to have a width larger than the distance between the two flanges by 50 to 100 $\mu$m. It is described that the wider backing paper is effective to keep the photographic film from exposure to light and the depressed flange assists smooth winding of the backing paper.

SUMMARY OF THE INVENTION

The present invention has an object to provide a photographic 120-size film roll which is easily produced and highly protected from exposure to light.

The invention resides in a photographic film roll comprising a spool which has a spool core having a slit therein and a flange at both ends of the spool core and a photographic 120-size film which is placed and fixed on a continuous light-shielding backing paper, in which one end of the backing paper is inserted into the slit of the spool core and other portion of the backing paper is wound on the spool core to form multiple convolutions, wherein the backing paper has at the center in its longitudinal direction a width less than the distance between the two flanges measured at the position of ½ of height of the flanges and has two wide areas of at least 10 cm long one of which is within 50 cm area measured from its one end and another of which is within 50 cm area measured from its another end, the width of each wide area being larger than the distance between the two flanges measured at the tops of the flanges.

In the photographic film roll of the invention, the width of each wide area of the backing paper preferably is larger than the width of the backing paper at the center by 0.02 to 0.2 mm, more preferably by 0.05 to 0.17 mm.

DETAILED DESCRIPTION OF THE INVENTION

The photographic 120-size roll film of the invention is further described with reference to the drawings attached to the specification.

Figure 1:
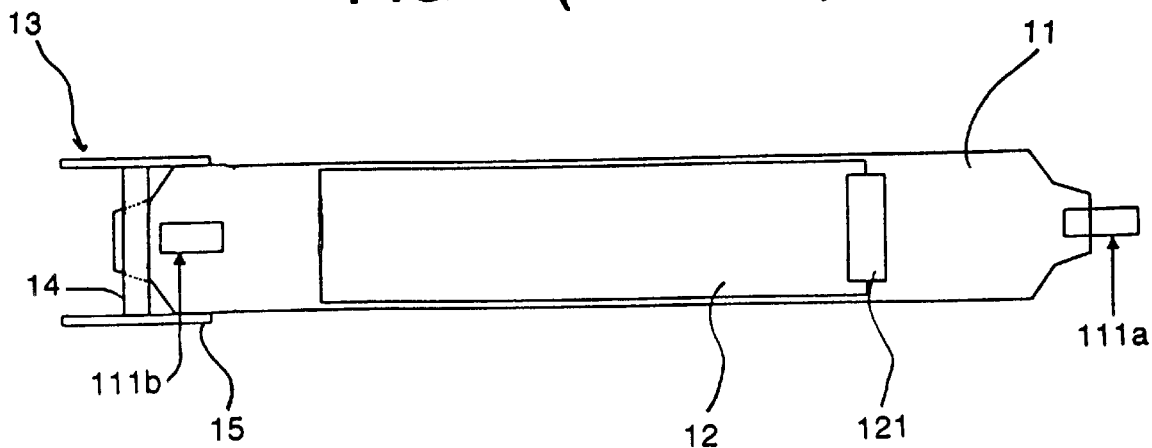
FIG. 1 illustrates a typical structure of the known photographic 120-size Brownie film roll in an extended form.

The photographic 120-size film roll of the invention is mainly characterized by enlarging the width on each end in the longitudinal direction of the light-shielding backing paper, as compared with the width of the backing paper at the center position, so that the wide end portions well cover the photographic film to keep it from unintentional exposure to light not only before the photographic film roll is charged into a camera for shooting but also after the shooting is complete and the photographic film roll is discharged from the camera. Therefore, an overview of the photographic 120-size film roll of the invention is almost the same as that of the known photographic 120-size film roll which is illustrated in FIG. 1.

Figure 2:
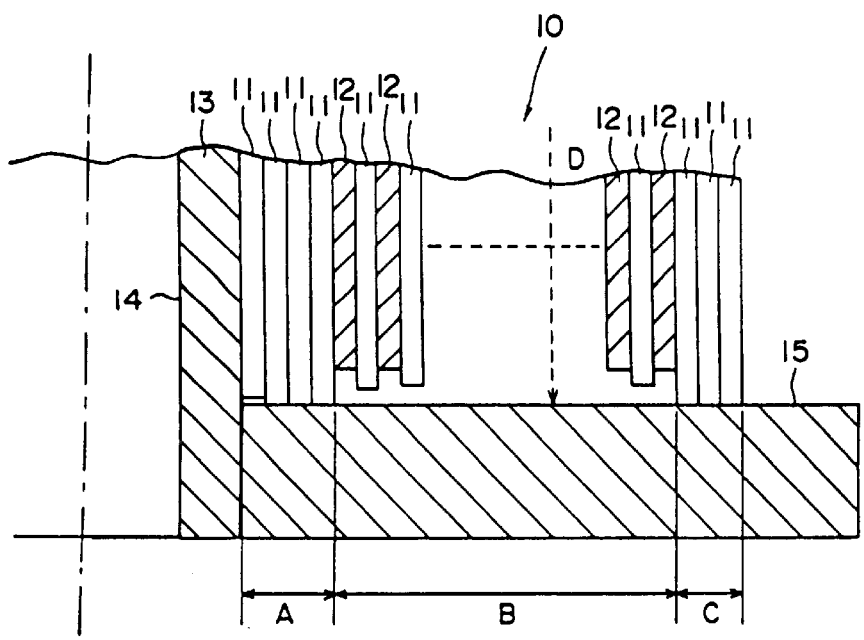
FIG. 2 illustrates an enlarged partial section of a photographic 120-size film roll of the invention.

FIG. 2 schematically illustrates an enlarged partial section of a photographic 120-size film roll of the invention.

The photographic film roll 10 of FIG. 2 is composed of innermost convolutions (A) comprising a light-shielding backing paper 11 only which is wound on a spool core 14 of a spool 13, middle convolutions (B) comprising a combination of a light-shielding backing paper 11 and a photographic film 12, and outermost convolutions (C) comprising a backing paper 11 only. The backing paper 11 of the innermost convolutions shall form outermost convolutions after the photographic film is exposed to light for shooting. The light-shielding backing paper has an area having a larger width in both of the innermost convolutions (A) and the outermost convolutions (C) as compared with the distance between the two flanges 15 so that the larger width sufficiently covers the photographic film to keep it from unintentional exposure to light, not only before the photographic film roll is charged into a camera but also after the exposed photographic film is discharged from the camera. The light-shielding backing paper has an area of relatively narrow width in the middle portion so that the backing paper can have at its middle portion a width less than the distance (D) between the two flanges. Therefore, thus formed clearance between the side edge of the narrow backing paper and the inner surface of the flange allows smooth winding of the combination of the backing paper and the photographic film not only in the step of manufacturing the photographic film roll but also in the camera after each shooting.

Figure 3:
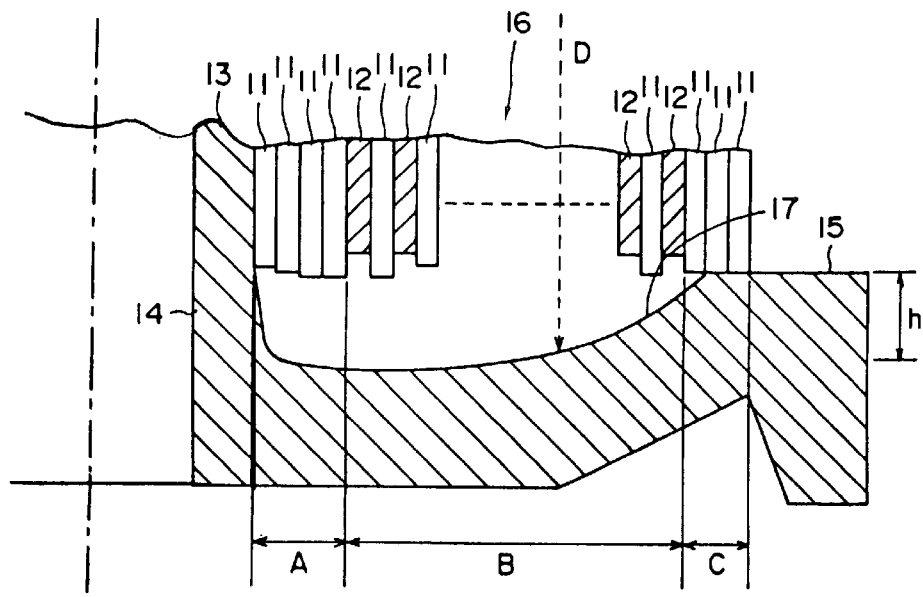
FIG. 3 illustrates an enlarger partial section of another photographic 120-size film roll of the invention.

FIG. 3 schematically illustrates an enlarged partial section of a preferred photographic 120-size film roll of the invention.

The photographic film roll 16 of FIG. 3 is also composed of innermost convolutions (A) comprising a light-shielding backing paper 11 only which is wound on a spool core 14 of a spool 13, middle convolutions (B) comprising a combination of a light-shielding backing paper 11 and a photographic film 12, and outermost convolutions (C) comprising a backing paper 11 only. The backing paper 11 of the innermost convolutions forms outermost convolutions after the photographic film is exposed to light for shooting. The light-shielding backing paper has an area having a larger width in both of the inner-most convolutions (A) and the outermost convolutions (C) as compared with the distance between the two flanges 15 so that the larger width sufficiently covers the photographic film to keep it from unintentional exposure to light, not only before the photographic film roll is charger into a camera but also after the exposed photographic film is discharged from the camera.

In the photographic film roll of FIG. 3, the distance between the two flanges measure at ½ of height of the flanges is longer than the distance between the two flanges measured at the tops of the flanges. In more specifically, in the photographic film roll of FIG. 3, both flanges have a depression 17 in the form of a ring in an area including the position of ½ of height of the flange. The depression in the form of a ring is preferably formed on the inner surface of the flange in an area from $1/11$ to $9/11$ of height of the flange. In order words, the depression is preferably formed to receive all convolutions made of a combination of the light-shielding backing paper 11 and the photographic film 12 with an enough clearance between the side edges of the convolutions and the inner surfaces of the flanges. The depth (h) of the depression 17 preferably 0.1 to 0.2 mm. In the area of outermost convolutions (C), the backing paper preferably has a width larger than the distance between the two flanges at the top position by 0.03 to 0.6 mm.

Moreover, the light-shielding backing paper has an area of relatively narrow width in the middle portion so that the backing paper can have at its middle portion a width less than the distance (D) between the two flanges at a middle height. Therefore, thus formed clearance between the side edge of the narrow backing paper and the inner surfaces of the flanges allows smooth winding of the backing paper together with the photographic film not only in the production of the photographic film roll but also in the camera after each shooting.

Figure 4:
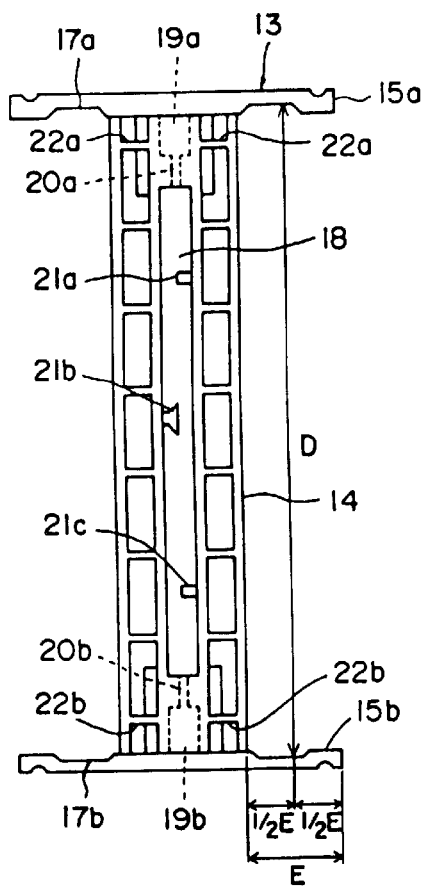
FIG. 4. illustrates a spool which is favorably employable for the preparation of a photographic 120-size film roll of the invention.

FIG. 4 illustrates a spool which is favorably employable for the preparation of a photographic 120- size film roll of the invention. The spool 13 has a spool core 14 in which a slit 18 is formed in its center in the axial direction and a pair of flanges 15a, 15b on its axial ends. The spool core 14 has a pair of winding slots 19a, 19b in both ends. The winding slots 19a, 19b are communicated with the slit 18 through air passages 20a, 20b, respectively. From the winding slots 19a, 19b, air is introduced into the slit 18. In the figures of the attached drawings, the distance (D) corresponds to a distance between the two flanges measured at the position of ½ of height (E) of the flanges. In the slit 18, three backing paper fixing units 21a, 21b, 21c are preferably provided. In the spool core 14, holes 22a, 22b are preferably formed so that smooth molding of the spool can be attained.

There are no specific limitation with respect to material of the spool, and known material for the spool can be employed. For instance, the resin material described in the aforementioned Japanese Patent Provisional Publication No. H9-288335 can be employed in combination with light-shielding material, dispersant, lubricant, etc., which are per se known.

There also are no specific limitation with respect to material of the light-shielding backing paper, and known material for the backing paper can be employed. For instance, light-shielding backing paper comprising a pulp sheet and a carbon black-containing plastic material sheet which are described in Japanese Patent Provisional Publications No. H4-136842, No. H6-51450, and No. H9-288335, can be employed.

Figure 5:
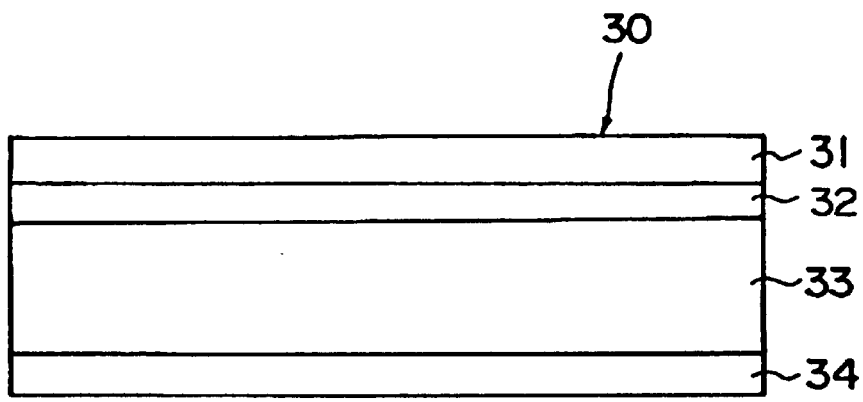
FIG. 5 illustrates a section of a light-shielding backing paper.

A section of a typical structure of the light-shielding backing paper is schematically illustrated in FIG. 5. A light-shielding backing paper 20 of FIG. 5 comprises, from top to bottom, a lacquer layer (i.e., protective layer) 31, a printed layer 32, a pulp sheet (i.e., paper support) 33, and a light-shielding layer 34. The light shielding backing paper 30 of FIG. 5 can be produced by the steps of: laminating a LDPE (i.e., low density polyethylene) film which contains carbon black and is prepared by inflation method on a white pulp sheet 33, by dry lamination method, to form the light-shielding layer 34; forming a printed layer on the back side of the white pulp sheet 33 by gravure printing method; and coating a lacquer on the printed layer by gravure coating method.

The light-shielding backing paper modified in its shape according to the invention can be prepared by mechanically cutting appropriately a light-shielding paper. However, in order to avoid increase of manufacturing steps, the light-shielding backing paper having the specific shape is preferably produced simultaneously with the production of the photographic 120-size film roll of the invention.

For instance, the wide area of the light-shielding backing paper on each end is produced by keeping a photographic film roll comprising a spool of 13 (illustrated in FIG. 4) which has a spool core 14 having a slit 18 therein and a least one end an opening 19a, 19b communicating with the slit 18 and a flange at both end of the spool core 14 and a photographic 120-size film which is place and fixed on a continuous light-shielding backing paper whose water content has been adjusted to a level of not high than 3 wt. %, in which one end of the backing paper is inserted into the slit 18 of the spool 13 and other portion of the backing paper is wound on the spool 13 to form multiple convolutions, at a temperature of 23±5° C., a relative humidity in the range of 45 to 67% (preferably 45 to 55% RH) for a period of 20 to 200 hours. After the manufacture in the above-described manner is complete, the photographic film roll of the invention is preferably kept in a moisture sealing bags which also keep the photographic film from exposure to light.

The invention is further described by the following working example.

Manufacture of Photographic 120-Size Film

A continuous light-shielding paper (length: 145 cm, width: 62.75 mm) of a structure illustrated in FIG. 5 was adjusted to have a water content of approximately 3 wt. %. As is illustrated in FIG. 1, on the light-shielding layer 34 of the light-shielding paper 11 having the adjusted water content, a continuous photographic film 12 was placed on the light-shielding layer 34 and one end of the photographic film 12 was fixed on the light-shielding paper 11 by an adhesive tape to produce a laminate of a light-shielding backing paper and a photographic film. One end of the laminate was inserted into a slit 18 of a spool 13 of FIG. 4 which had an inner distance (D) of 63.10 mm (h: 0.2 mm), and other portion of the laminate was wound on the spool core 14 tightly. The other end of the laminate was fixed by a sealing means on the outer-most convolution of the laminate would on the spool core.

Thus formed roll was kept at 23° C., 50 % RH for 100 hours, and the roll was placed in a moisture-shielding bag.

Evaluation

The roll having been kept at 23° C., 50% RH for 100 hours was extended to separate the light-shielding backing paper from the roll, and the width of the backing paper was measured at various positions in the longitudinal directions. The results are set forth in FIG. 6, in which the length in the axis of abscissas is measured from the end of the backing paper inserted into the spool.

Figure 6:
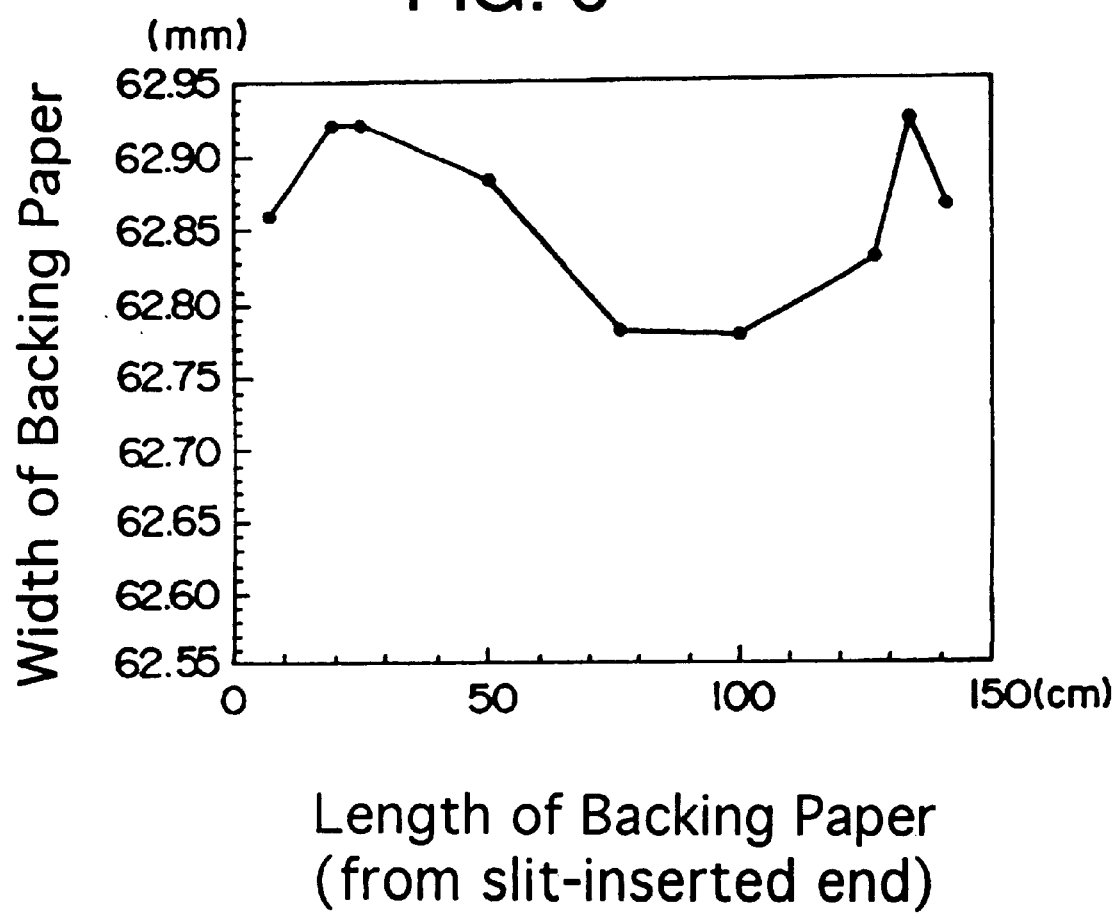
FIG. 6 graphically illustrates a relationship between a longitudinal position and a width which was determined in one photographic 120-size film roll according to the invention.

FIG. 6 indicates that the light-shielding backing paper has a width of 62.78 mm at the 75 cm position (measured from the slit-inserted end), a width of larger than 62.86 mm in the area of 5 to 55 cm, and a width of larger than 62.87 mm in the area of 130 to 145 cm.

The photographic film roll having been processed in the same manner as mentioned above was kept for 5 minutes under irradiation of light of 100,000 lux. After the irradiation was complete, the photographic film was developed. No fogging caused unintentional exposure was observed in the developed photographic film

What is claimed is:

1. A photographic film roll comprising a spool which has a spool core having a slit therein and a flange at both ends of the spool core and a photographic 120-size film which is placed and fixed on a continuous light-shielding backing paper, in which one end of the backing paper is inserted into the slit of the spool core and other portion of the backing paper is wound on the spool core to form multiple convolutions, wherein the backing paper has at the center in its longitudinal direction a width less than the distance between the two flanges measured at the position of ½ of height of the flanges and has two side area of at least 10 cm long one of which is within 50 cm area measured from its one end and another of which is within 50 cm area measured from its another end, the width of each wide area being larger than the distance between the two flanges measured at the tops of the flanges.

2. The photographic film roll of claim 1, wherein the width of each wide area of the backing paper is larger than the width of the backing paper at the center by 0.02 to 0.2 mm.

3. The photographic film roll of claim 2, wherein the width of each wide area of the backing paper is larger than the width of the backing paper at the center by 0.05 to 0.17 mm.

4. The photographic film roll of claim 1, wherein the distance between the two flanges measured at ½ of height of the flanges is longer than the distance between the two flanges measured at the tops of the flanges.

5. The photographic film roll of claim 1, wherein both flanges have a depression in the form of a ring in an area including the position of ½ of height of the flange.

6. The photographic film roll of claim 1, wherein the spool core has at least one end an opening which is communicated with the slit.

7. The photographic film roll of claim 1, wherein the wide area on each end is produced by keeping a photographic film roll comprising a spool which has a spool core having a slit therein and at least one end an opening communicating with the slit and a flange at both ends of the spool core and a photographic 120-size film which is placed and fixed on a continuous light-shielding backing paper whose water content has been adjusted to a level of not high than 3 wt. %, in which one end of the backing paper is inserted into the slit of the spool and other portion of the backing paper is wound on the spool to form multiple convolutions, at a temperature of 23±5° C., a relative humidity in the range of 45 to 67% for a period of 20 to 200 hours.

* * * * *